April 15, 1930.  T. R. CUMMINGS  1,754,614
CULTIVATOR ATTACHMENT FOR TRACTORS
Filed May 1, 1929   2 Sheets-Sheet 1
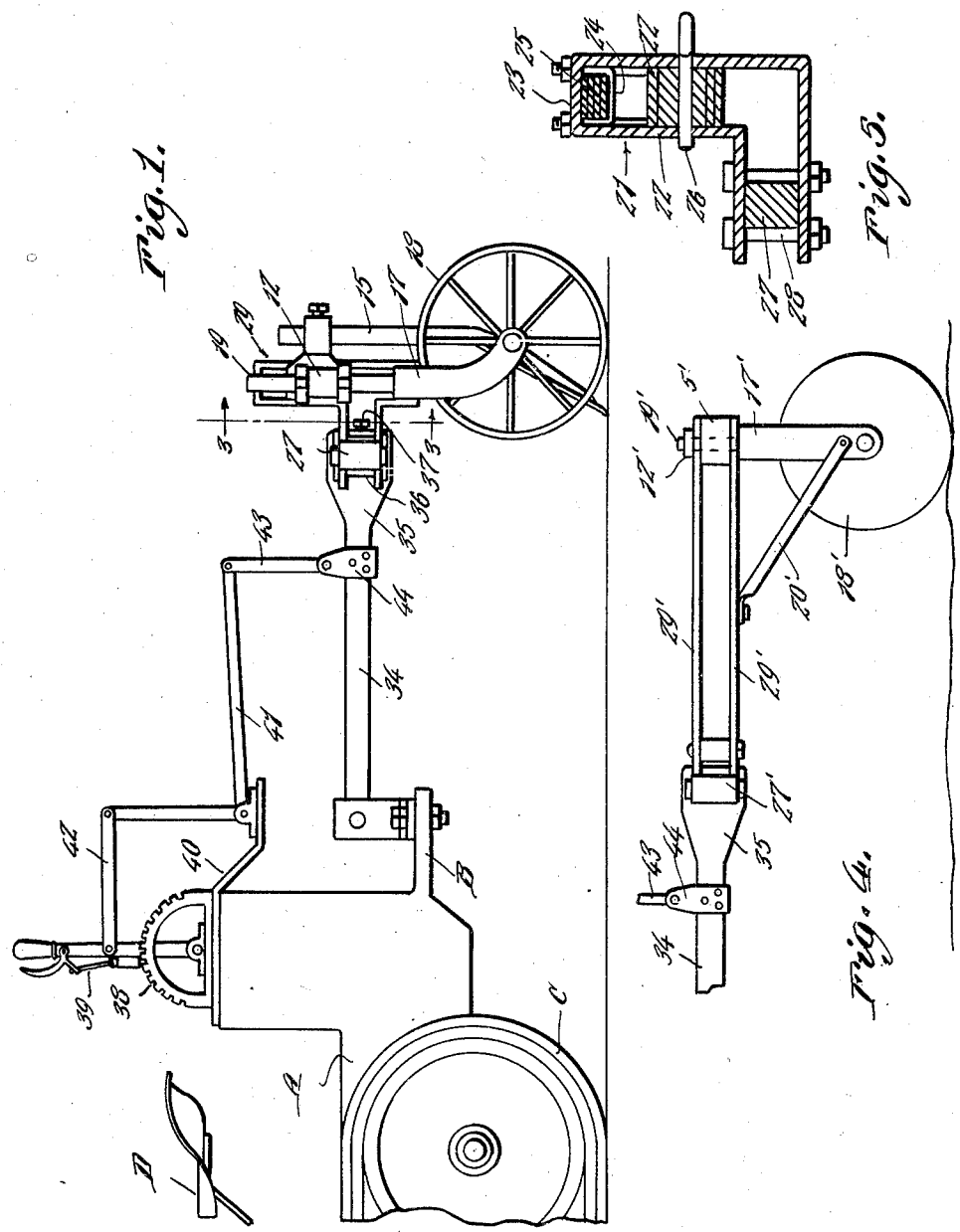
Inventor
*T. R. Cummings*
By *Clarence A. O'Brien*
Attorney

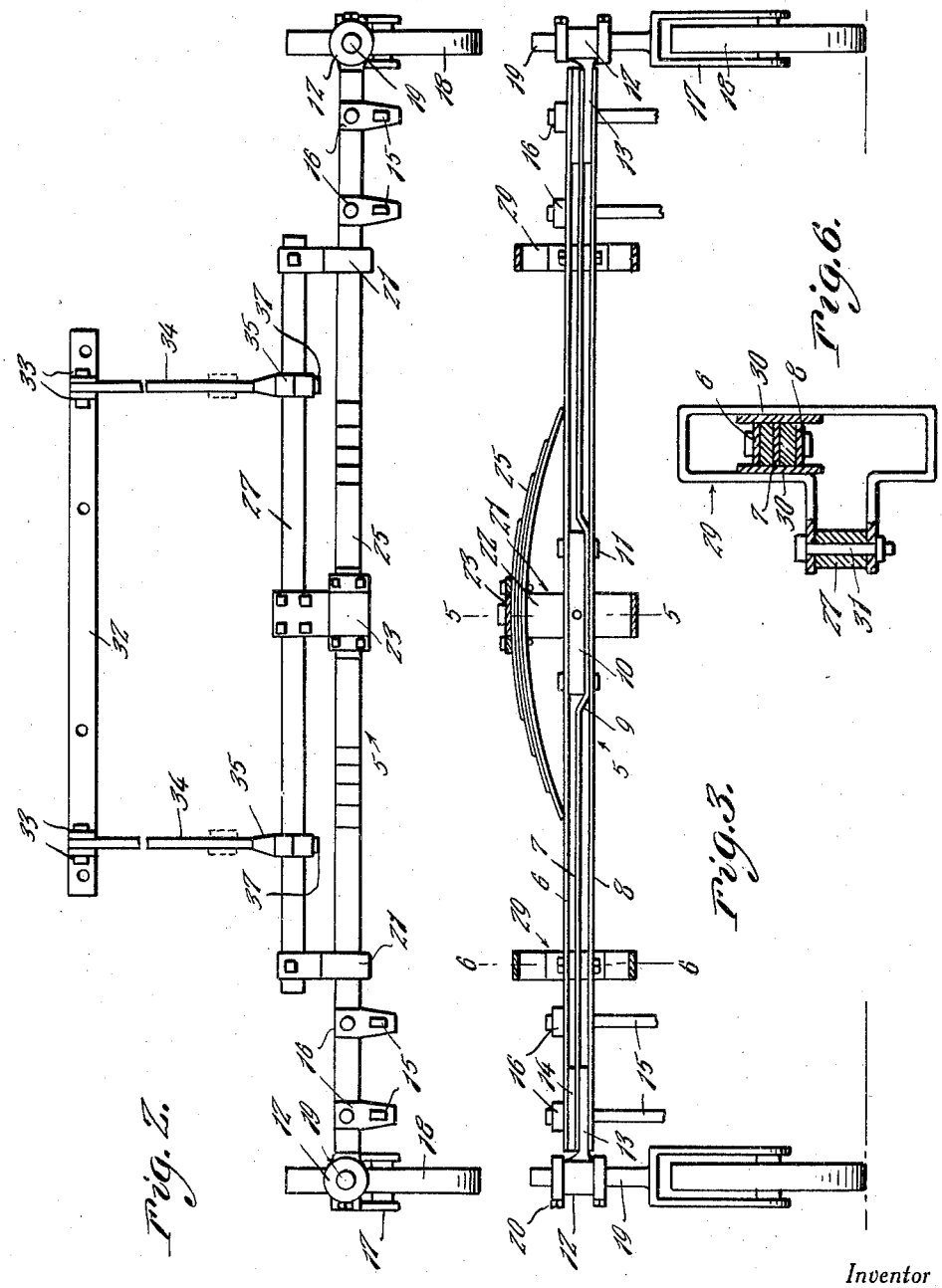

Patented Apr. 15, 1930

1,754,614

UNITED STATES PATENT OFFICE

THOMAS RICHARD CUMMINGS, OF WALNUT GROVE, CALIFORNIA

CULTIVATOR ATTACHMENT FOR TRACTORS

Application filed May 1, 1929. Serial No. 359,603.

This invention appertains to improvements in cultivators and more particularly to the cultivator in the form of an attachment for tractors.

The primary object of the invention is to provide a cultivator capable of being readily attached to a tractor for use.

Another important object of the invention is to provide a cultivator attachment for tractors embodying a wide range of adjustment and practicability in operation.

These and other objects of the invention will become more apparent to the reader after considering the invention as described and claimed hereinafter.

In the drawings:

Figure 1 represents a side elevation of the improved cultivator attached to the tail end of a tractor.

Figure 2 represents a top plan view of the attachment.

Figure 3 represents a vertical sectional view through the attachment, taken substantially on the line 3—3 of Figure 1 and looking in the direction of the arrows.

Figure 4 is a fragmentary side elevation of a modification of the present invention.

Figure 5 represents a vertical detail sectional view, taken substantially on line 5—5 of Figure 3.

Figure 6 represents a vertical detail sectional view, taken substantially on line 6—6 of Figure 3.

Referring to the drawings wherein like numerals designate like parts, it will be seen that a conventional form of tractor A has the usual tail piece B as well as the traction belt C and seat D for the operator.

The wheeled support for the cultivator shovel is generally referred to by numeral 5 and consists in construction of elongated bars 6, 7, and 8. The bar 7 is offset at its intermediate portion 9 to receive a spacing block 10, and suitable bolts 11 serve to secure the bars and blocks together.

A sleeve 12 at each end of the wheeled support is provided with a shank 13 for disposition between the bars 7 and 8, while a spacer 14 spaces the bar 7 from the bar 6 and the bars, shank 13, and spacer 14 are secured together by one of the shanks 15 extending through these parts and secured as at 16. A fork 17 has a wheel 18 rotatably mounted therein and is provided with a shaft extension 19 for adjustable disposition through the sleeve 12. The shaft may be retained in set position by the set screws 20.

A frame 21 consists of a pair of L-shaped portions 22—22 disposed in parallel relation as at 23. The connecting portion 23 receives the threaded ends of an U-bolt 24 for supporting a leaf spring 25, which is of the semi-elliptical type with its ends resting upon the uppermost bar 6, as substantially shown in Figure 3.

The bars 6, 7, and 8 pass through the upper portion of the frame and a pin 26 passes through the frame members 22, 22 and the block 10 for fixing the frame on the wheeled support.

The free end of the L-shaped members 22—22 have an elongated bar 27 disposed therebetween and secured by bolts 28. The bar 27 is disposed in parallelism with respect to the bars 6, 7, and 8 and each end of the bar 27 is disposed between the free ends of a substantially T-shaped frame 29.

Wear plates 30—30 are provided within the frame between which the plates 6, 7, and 8 are movably disposed. A bolt 31 secures the frames to the bar 27 in the manner shown in Figure 6.

An elongated member 32 is secured upon the tail piece B of the tractor and this member 32 has a pair of ears 33 at each end thereof. An elongated arm 34 projects from each end of the member 32 and has its adjacent end pivotally secured between a pair of the ears 33.

A head 35 is provided at the opposite end of each arm and the head is provided with an opening 36 for receiving the bar 27. A clamp screw 37 is threaded into the head 35, and is adapted to secure the bar 27 firmly to the head.

A rack 38 and detent 39 is provided on the tractor A and a bracket 40 projecting from the tractor supports an L-shaped rocker arm 41. The upper end of the arm 41 is connected by the link 42 to the detent 39, while the opposite end of the arm has a pivotal connection 43 to a clamped block 44 on one of the arms 34.

Figure 4 discloses a modification of the invention wherein the bar 27' is disposed through the heads 35 in lieu of the bar 27 in the preferred form of the invention. This bar 27' has rearwardly extending frame pieces 29' between the rearward ends of which is disposed a transversely extending piece 5'. At each end of the cross piece 5', the shank 19' of a yoke 17' extends and is secured by a nut 12'. A wheel 18' is rotatably mounted within each yoke. A brace member 20' extends from the under side of the frame piece 29' to each yoke 17'.

It will thus be seen that the present invention embodies a cultivator attachment wherein various adjustments may be made to accord with corresponding conditions and the invention also presents means for permitting its ready attachment or detachment with respect to the tractor A.

Having described the invention, what is claimed as new is:

1. A cultivator attachment for tractors comprising a wheeled frame, earth digging elements secured to said frame, an arm extending from said frame and being pivotally connected to the tractor, and means for raising said wheeled frame to disengage the earth digging element, said wheeled frame consisting of a pair of parallel members, one of said members having the arm projecting therefrom, the other member being adapted to support the wheels, and a coupling between the first mentioned member and the second mentioned member and within which the second mentioned member is movable.

2. A cultivator attachment for tractors comprising a wheeled frame, earth digging elements secured to said frame, an arm extending from said frame and being pivotally connected to the tractor, and means for raising said wheeled frame to disengage the earth digging element, said wheeled frame consisting of a pair of parallel members, one of said members having the arm projecting therefrom, the other member being adapted to support the wheels, and a coupling between the first mentioned member and the second mentioned member and within which the second mentioned member is movable, and a spring interposed between the last mentioned frame piece and the coupling for absorbing shocks.

In testimony whereof I affix my signature.

THOMAS RICHARD CUMMINGS.